US012392157B1

(12) United States Patent
Yang

(10) Patent No.: US 12,392,157 B1
(45) Date of Patent: Aug. 19, 2025

(54) WATER SURFACE CLEANING APPARATUS

(71) Applicant: Shenzhen Aiper Intelligent Co., Ltd., Shenzhen (CN)

(72) Inventor: Zhengbin Yang, Shenzhen (CN)

(73) Assignee: Shenzhen Aiper Intelligent Co., Ltd., Shenzhen (CN)

( * ) Notice: Subject to any disclaimer, the term of this patent is extended or adjusted under 35 U.S.C. 154(b) by 0 days.

(21) Appl. No.: 18/969,914

(22) Filed: Dec. 5, 2024

(30) Foreign Application Priority Data

Aug. 21, 2024 (CN) .......................... 202422037162.4

(51) Int. Cl.
| | | |
|---|---|---|
| *E04H 4/16* | (2006.01) | |
| *B63B 35/32* | (2006.01) | |
| *B63H 11/08* | (2006.01) | |
| *C02F 1/00* | (2023.01) | |
| *B63B 35/00* | (2020.01) | |
| *C02F 103/42* | (2006.01) | |

(52) U.S. Cl.
CPC .......... *E04H 4/1663* (2013.01); *B63B 35/32* (2013.01); *B63H 11/08* (2013.01); *C02F 1/001* (2013.01); *B63B 2035/007* (2013.01); *C02F 2103/42* (2013.01); *C02F 2201/008* (2013.01)

(58) Field of Classification Search
CPC . E04H 4/1663; B63B 35/32; B63B 2035/007; B63H 11/08; C02F 1/001; C02F 2103/42; C02F 2201/008
USPC ................ 210/167.2, 167.16, 167.17; 15/1.7
See application file for complete search history.

(56) References Cited

U.S. PATENT DOCUMENTS

| | | | | |
|---|---|---|---|---|
| 6,652,742 B2 * | 11/2003 | Henkin | ................. | E04H 4/1654 210/167.16 |
| 8,012,345 B2 * | 9/2011 | Hui | ....................... | E04H 4/1654 210/167.17 |
| 8,709,245 B2 * | 4/2014 | Hui | ....................... | E04H 4/1654 210/167.17 |
| 2001/0032809 A1 * | 10/2001 | Henkin | ................. | E04H 4/1654 210/97 |

FOREIGN PATENT DOCUMENTS

WO WO-0136335 A1 * 5/2001 ........... E04H 4/1654

* cited by examiner

*Primary Examiner* — Fred Prince
(74) *Attorney, Agent, or Firm* — David D. Brush; Westman, Champlin & Koehler, P.A.

(57) ABSTRACT

A water surface cleaning apparatus, which includes: a housing including a front end located close to a traveling direction of the apparatus and a rear end far away from the traveling direction of the apparatus; a filtering unit detachably arranged in the housing and including a water inlet and a water outlet, for filtering water entering the filtering unit via the water inlet and discharging filtered water out of the filtering unit via the water outlet; a driving unit for driving the apparatus to travel on the water surface; waterflow channels are symmetrically arranged on both sides of a longitudinal axis between the front end and the rear end, and the driving unit can drive the apparatus to travel on the water surface by driving the waterflow passing through the waterflow channels; a direction of the waterflow path provided by the waterflow channel is inclined to the longitudinal axis.

20 Claims, 6 Drawing Sheets

WATER SURFACE CLEANING APPARATUS

CROSS-REFERENCE

The present disclosure claims a benefit of, and priority to Chinese Patent Application No. 202422037162.4 filed on Aug. 21, 2024, the disclosure of which is hereby expressly incorporated by reference herein in its entirety.

TECHNICAL FIELD

The disclosure relates to a water surface cleaning apparatus.

BACKGROUND

The water surface cleaning apparatus is generally used for cleaning the water surface of a pool, for example, collecting and cleaning garbage/debris on the water surface of a pool, such as a swimming pool, so as to filter and purify the water in the pool.

SUMMARY

According to an aspect of the present disclosure, a water surface cleaning apparatus is provided, which includes a housing including a front end located close to a traveling direction of the water surface cleaning apparatus and a rear end far away from the traveling direction of the water surface cleaning apparatus; a filtering unit detachably arranged in the housing, the filtering unit comprising a water inlet and at least one water outlet, the filtering unit configured to filter water entering the filtering unit through the water inlet and discharge the filtered water out of the filtering unit through the at least one water outlet; a driving unit configured to drive the water surface cleaning apparatus to travel on the water surface; wherein waterflow channels are symmetrically arranged on both sides along a longitudinal axis between the front end and the rear end of the housing, and the driving unit is configured to drive the water surface cleaning apparatus to travel on the water surface by driving the waterflow through each of the waterflow channels; wherein, a direction of a waterflow path provided by each of the waterflow channels is approximately inclined with respect to the longitudinal axis.

According to an embodiment of the present disclosure, in the above-mentioned water surface cleaning apparatus, the waterflow channel comprises a water inlet and a water outlet, wherein the water inlet is arranged on a side of the housing, and the water outlet is arranged at the rear end of the housing.

According to the embodiment of the present disclosure, in the water surface cleaning apparatus, the water inlet of the filtering unit is closer to the front end of the housing than the water inlet of the waterflow channel.

According to an embodiment of the present disclosure, in the above-mentioned water surface cleaning apparatus, the water discharged from at least one water outlet of the filtering unit is discharged from the water surface cleaning apparatus via at least one opening provided on the housing.

According to the embodiment of the present disclosure, in the above-mentioned water surface cleaning apparatus, the water discharged from at least one water outlet of the filtering unit is discharged from the water surface cleaning apparatus via the waterflow channel.

According to an embodiment of the present disclosure, in the above water surface cleaning apparatus, in response to the driving unit driving the water surface cleaning apparatus to move forward, the direction of the waterflow path provided by the waterflow channel is a direction from the water inlet of the waterflow channel to the water outlet of the waterflow channel; and in response to the driving unit driving the water surface cleaning apparatus to move backward, the direction of the waterflow path provided by the waterflow channel is a direction from the water outlet of the waterflow channel to the water inlet of the waterflow channel.

According to an embodiment of the present disclosure, in the above water surface cleaning apparatus, the driving unit is arranged in the waterflow channel, and the driving unit includes a propeller.

According to an embodiment of the present disclosure, in the above water surface cleaning apparatus, a rotation direction of the propeller when the driving unit drives the water surface cleaning apparatus to move backward is opposite to the rotation direction of the propeller when the driving unit drives the water surface cleaning apparatus to move forward.

According to an embodiment of the present disclosure, in the water surface cleaning apparatus, a buoyancy unit is arranged between the filtering unit and the waterflow channel, and the buoyancy unit is configured to provide buoyancy for suspending the water surface cleaning apparatus on the water surface; wherein, the water inlet of the filtering unit is provided with a flanging structure, and the flanging structure is configured to prevent water from passing through a gap between the filtering unit and the buoyancy unit.

According to the embodiment of the present disclosure, in the above-mentioned water surface cleaning apparatus, a waterflow guiding mechanism is arranged at the water inlet of the filtering unit, configured to guide the water in front of a traveling direction of the water surface cleaning apparatus to enter the filtering unit via the water inlet.

According to the embodiment of the present disclosure, in the water surface cleaning apparatus, the water inlet of the filtering unit is further provided with an openable baffle for adjusting the open or closed status of the filtering unit.

According to an embodiment of the present disclosure, in the above water surface cleaning apparatus, the filtering unit is a filter basket.

BRIEF DESCRIPTION OF THE DRAWINGS

In order to explain technical solutions in embodiments of the present disclosure more clearly, the drawings to be used in the description of the embodiments will be briefly introduced below. Apparently, the drawings in the following description only illustrate some embodiments of the present disclosure. For those skilled in the art, other drawings can be obtained according to these drawings without paying any creative work.

DETAILED DESCRIPTION

Figure 1A:
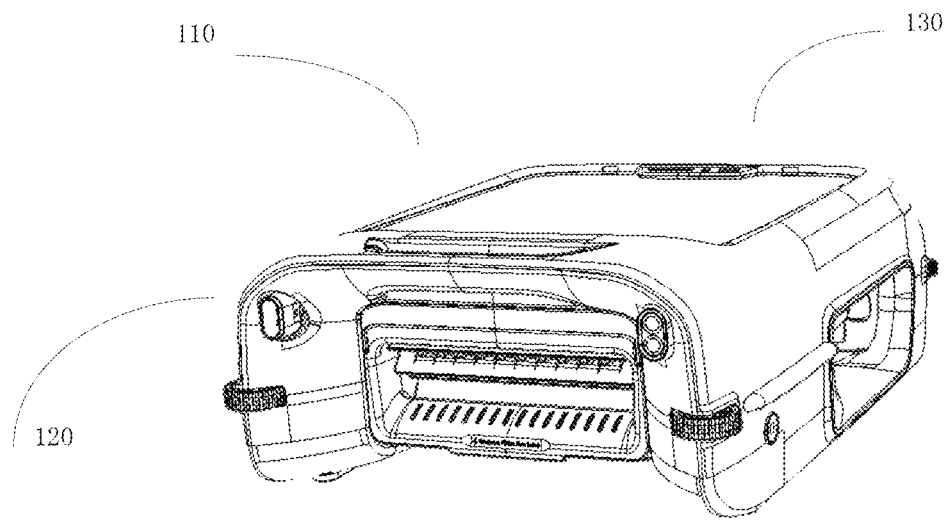
FIGS. 1A-1B illustrate a schematic appearance of a water surface cleaning apparatus according to an embodiment of the present disclosure.

The detailed description set forth below in connection with the drawings is intended as a description of various configurations, and is not intended to represent the only configurations in which the concepts described herein can be practiced. The detailed description includes specific details in order to provide a thorough understanding of various concepts. However, it will be apparent to one skilled in the art that these concepts may be practiced without these specific details.

In the description of this disclosure, it should be understood that the orientation and/or position relationships which are indicated by the terms such as center, longitudinal direction, lateral direction, length, width, thickness, up, down, front, back, left, right, vertical, horizontal, top, bottom, interior, exterior, clockwise, anti-clockwise, axial, radial, circumferential, one side, the other side and etc. refer to the orientation or position relationships illustrated in the drawings, which is only for the convenience of describing the present disclosure and simplifying the description, and does not indicate or imply that the device or element must have a specific orientation, be constructed or operated in a specific orientation, and thus it should not be interpreted to make any limitations on the present disclosure.

In addition, the terms such "first", "second", "third" and etc. involving the sequence are only used for descriptive purposes, and cannot be understood as indicating or implying relative importance or implicitly indicating the number of indicated technical features. Therefore, features defined with terms involving the sequence such as "first", "second", "third" and etc. can include at least one of these features explicitly or implicitly. In the description of this disclosure, "plural" means at least two, such as two, three, etc., unless otherwise specifically defined.

In addition, in the drawings, the dimensions may be exaggerated for clarity of illustration and are not drawn to the actual scale. Like reference numerals generally refer to like elements throughout the drawings.

Figure 1B:
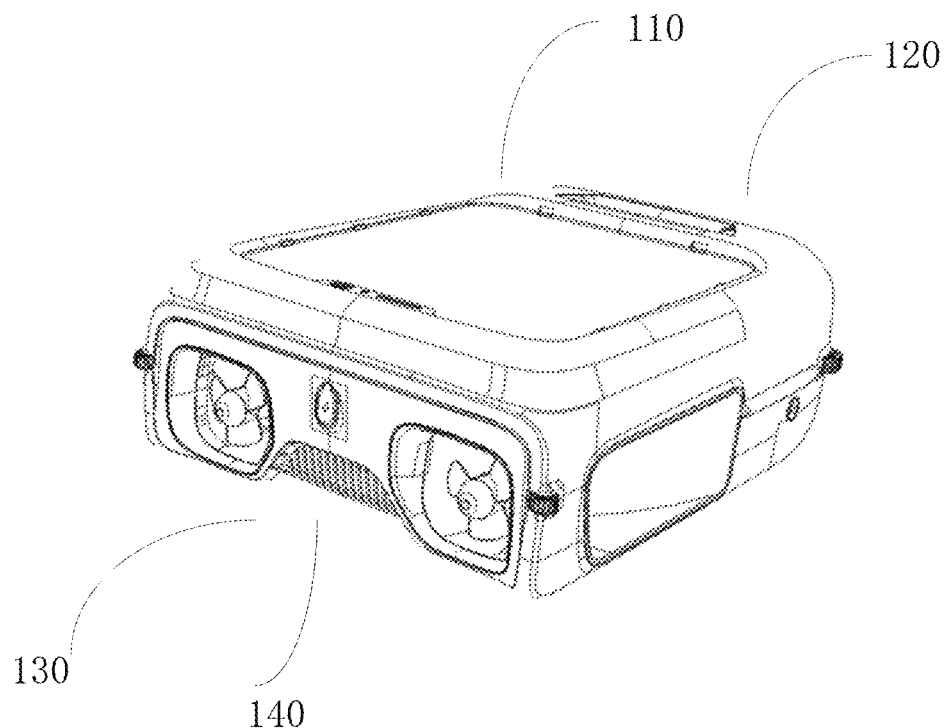

FIGS. 1A-1B schematically illustrate an appearance of a water surface cleaning apparatus according to an embodiment of the present disclosure. The water surface cleaning apparatus can clean the water surface of the pool as required, for example, for cleaning the garbage and debris on the water surface. As illustrated in FIGS. 1A-1B, the water surface cleaning apparatus may include a housing 110, which is generally boat-shaped; the housing 110 includes a front end 120 located near a traveling direction of the water surface cleaning apparatus and a rear end 130 far away from the traveling direction of the water surface cleaning apparatus.

Figure 2:
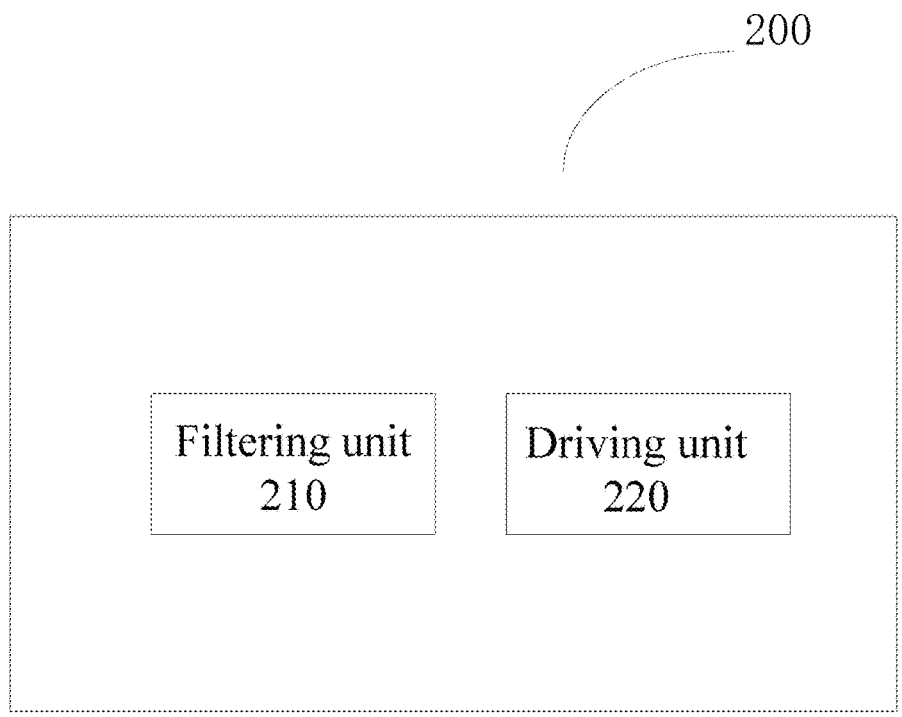
FIG. 2 is a schematic block diagram of a water surface cleaning apparatus according to an embodiment of the present disclosure.

FIG. 2 is a schematic block diagram of a water surface cleaning apparatus 200 according to an embodiment of the present disclosure. As illustrated in FIG. 2, the water surface cleaning apparatus may further include a filtering unit 210 detachably arranged in the housing of the water surface cleaning apparatus 200.

As an example, the filtering unit 210 includes a water inlet and at least one water outlet, and the filtering unit is configured to filter water entering the filtering unit through the water inlet and discharge the filtered water out of the filtering unit through the at least one water outlet.

According to an embodiment of the present disclosure, as illustrated in FIG. 2, the water surface cleaning apparatus 200 may further include a driving unit 220 configured to drive the water surface cleaning apparatus 200 to travel on the water surface.

Figure 3:
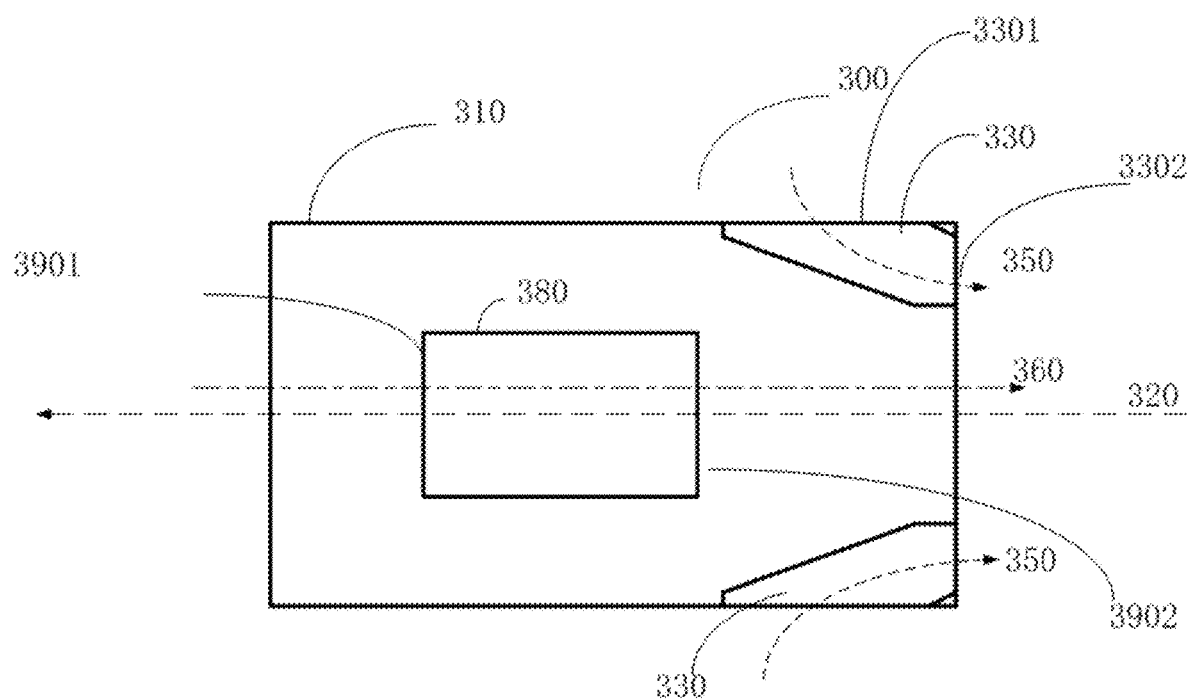
FIG. 3 schematically illustrates a layout of a housing, a filtering unit and waterflow channels of a water surface cleaning apparatus.

As an example, FIG. 3 schematically illustrates that waterflow channels 330 are symmetrically arranged on both sides of a longitudinal axis 320 between the front end and the rear end of the housing 310 of the water surface cleaning apparatus 300 (wherein the arrow of the longitudinal axis 320 indicates the direction from the rear end to the front end of the housing 310), and the driving unit can drive the water surface cleaning apparatus 300 to travel on the water surface by driving the waterflow through the waterflow channels 330; the direction of the waterflow path provided by each of the waterflow channels 330 (for example, as illustrated by the arrow 350 in FIG. 3) is approximately inclined with respect to the longitudinal axis 320.

As illustrated in FIG. 3, according to an embodiment of the present disclosure, in the above-mentioned water surface cleaning apparatus 300, each of the waterflow channels 330 may include a water inlet 3301 and a water outlet 3301. As an example, the water inlet may be arranged at the side of the housing, and the water outlet may be arranged at the rear end of the housing.

It should be understood that the shapes, positions, numbers of the waterflow channels 330, the water inlet 3301 and the water outlet 3301, and the proportional relationships with regard to the housing 310 as illustrated in FIG. 3 are only schematic, and do not constitute any restrictions on the principles of the present disclosure.

As mentioned above, the detachable filtering unit filters the water that enters the filtering unit through the water inlet, and discharges the filtered water from the filtering unit through at least one water outlet. As illustrated in FIG. 3, the arrow 360 schematically illustrates the path direction of the waterflow which flows in and out of the housing 310 of the water surface cleaning apparatus 300 through the filtering unit 380. As an example, the filtering unit 380 filters and purifies water entering the filtering unit 380 through the water inlet 3901, filters out impurities therein, and discharges the cleaned water out of the filtering unit 380 through the water outlet 3902.

According to the embodiment of the present disclosure, a suction can be generated by a driving component such as a water pump, thereby generating waterflow through the filtering unit 380, and/or water in front of the water surface cleaning apparatus can automatically flow into the filtering unit 380 to generate waterflow through the filtering unit 380 when the water surface cleaning apparatus travels on the water surface.

As an example, in the water surface cleaning apparatus, the water inlet of the filtering unit is closer to the front end of the housing than the water inlet of each of the waterflow channels.

It should be understood that the shapes, positions and numbers of the filtering unit 380, the water inlet 3901 and the water outlet 3902, and the proportional relationships with regard to the housing 310 as illustrated in FIG. 3 are only schematic, and do not constitute any limitations on the principles of the present disclosure.

According to an embodiment of the present disclosure, an opening may be provided at any one of the rear side, front side, top or bottom of the housing 110 of the water surface cleaning apparatus 100. As further illustrated in FIG. 1B, an opening 140 may be provided at the rear side of the housing 110 of the water surface cleaning apparatus 100. In addition, openings can also be symmetrically arranged about the longitudinal axis of the body of the water surface cleaning apparatus, that is, the openings can be symmetrically arranged along the longitudinal axis at any positions of the rear side, front side, top and bottom of the body. As an example, the openings may be mesh-like or grid-like as required, so as to discharge the water filtered and cleaned by, for example, the filtering unit of the water surface cleaning apparatus into the pool.

In addition, according to an embodiment of the present disclosure, the water surface cleaning apparatus 100 may further include a water ejecting unit, and by guiding the water ejected by the water ejecting unit to an opening in a specific direction on the housing, the water surface cleaning apparatus can use the water ejected in the specific direction as a driving force for assisting travel, and can adjust the position and posture of the water surface cleaning apparatus.

Figure 4:
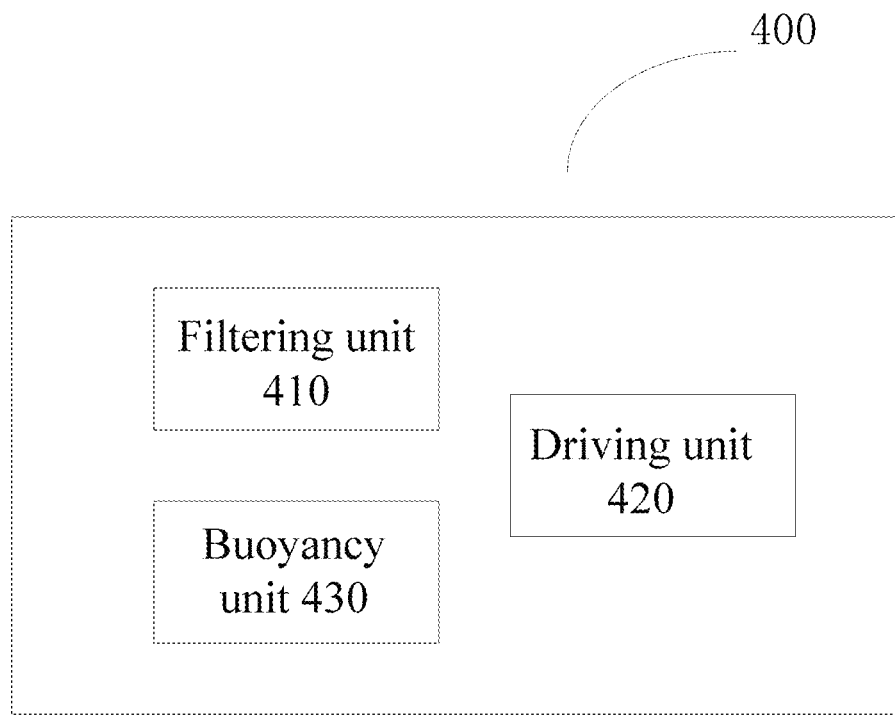
FIG. 4 is a schematic block diagram of a water surface cleaning apparatus according to an embodiment of the present disclosure.

According to an embodiment of the present disclosure, as illustrated in FIG. 4, the water surface cleaning apparatus 400 may further include a buoyancy control unit 430 in addition to a filtering unit 410 and a driving unit 420, and the buoyancy unit 430 may provide buoyancy for suspending the water surface cleaning apparatus 400 on the water surface. As an example, the buoyancy unit 430 may take the form of an air bag or an air cabin, and a buoyancy control mechanism such as an air pump can be controlled by a control unit of the water surface cleaning apparatus 400, so as to adjust the buoyancy provided by the buoyancy unit 430; as an example, the control unit may be a control circuit such as a microprocessor, a digital signal processor (DSP), and a microcontroller.

Although FIGS. 1A-1B illustrate the overall appearance of the water surface cleaning apparatus of embodiments of the present disclosure. It should be understood that this is only schematic and does not constitute any limitation on the principles of the present disclosure.

In addition, it should be understood that the water surface cleaning apparatus illustrated in FIGS. 2-4 are only examples, and those skilled in the art can change one or more aspects such as appearance, structure, layout, components, functions, etc. according to actual needs without departing from the principles of the present disclosure.

Figure 5A:
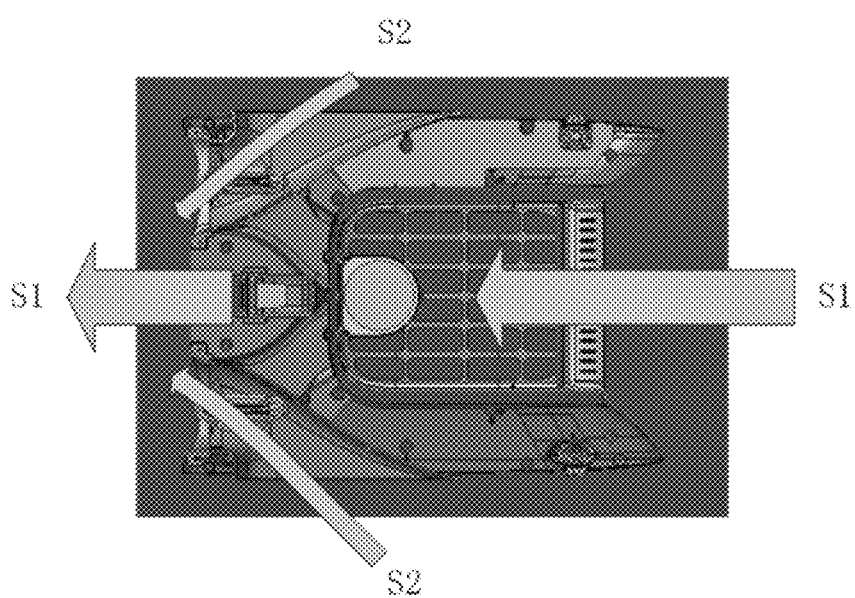
FIGS. 5A-5B schematically illustrate a waterflow path through a filtering unit of a water surface cleaning apparatus and a waterflow path through a waterflow channel of the water surface cleaning apparatus.

According to an embodiment of the present disclosure, in the above-mentioned water surface cleaning apparatus, the water discharged from at least one water outlet of the filtering unit can be discharged from the water surface cleaning apparatus through at least one opening provided on the housing of the water surface cleaning apparatus. FIG. 5A schematically illustrates a waterflow path S1 via the above-mentioned filtering unit of the water surface cleaning apparatus and a waterflow path S2 via the above-mentioned waterflow channel of the water surface cleaning apparatus. In the situation illustrated in FIG. 5A, the filtering unit of the water surface cleaning apparatus and the waterflow channel of the water surface cleaning apparatus cannot communicate with each other, that is, the water filtered by the filtering unit is discharged from the water surface cleaning apparatus through an opening (not illustrated) at the rear of the housing of the water surface cleaning apparatus instead of through waterflow channels symmetrically arranged on both sides of the longitudinal axis between the front end and the rear end of the housing, and the waterflow driven by the driving unit of the water surface cleaning apparatus flows through the waterflow channels, so that the water surface cleaning apparatus can be driven to travel on the water surface.

Figure 5B:
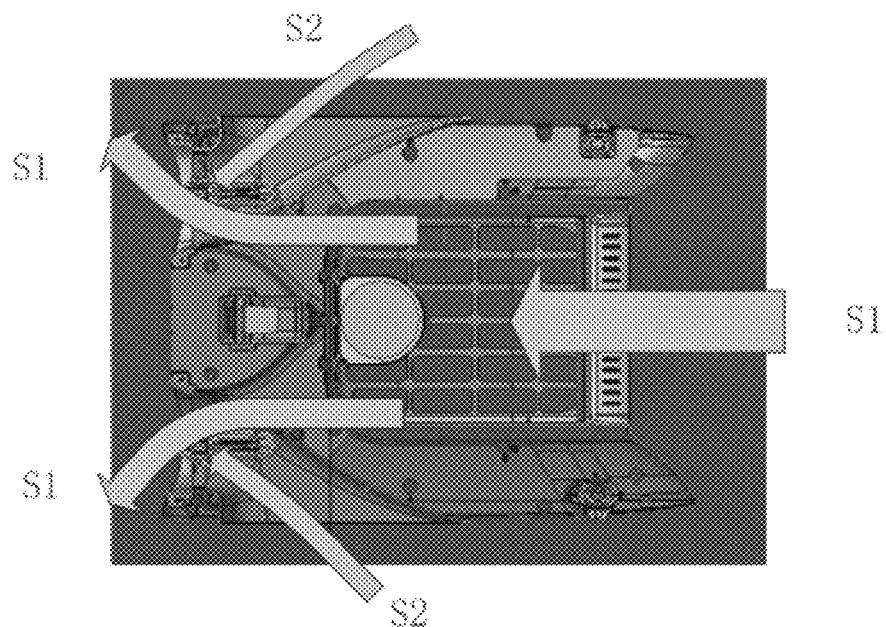

According to another embodiment of the present disclosure, in the water surface cleaning apparatus, the water discharged from at least one water outlet of the filtering unit can be discharged from the water surface cleaning apparatus through the waterflow channel(s) provided in the water surface cleaning apparatus. FIG. 5B schematically illustrates a waterflow path S1 via the filtering unit of the water surface cleaning apparatus and a waterflow path S2 via the waterflow channel(s) of the water surface cleaning apparatus. In the situation illustrated in FIG. 5B, at least one water outlet of the filtering unit of the water surface cleaning apparatus can communicate with the waterflow channel(s) of the water surface cleaning apparatus, that is, the water discharged from at least one water outlet of the filtering unit can be discharged from the water surface cleaning apparatus via each of the waterflow channels provided in the water surface cleaning apparatus.

Figure 7:
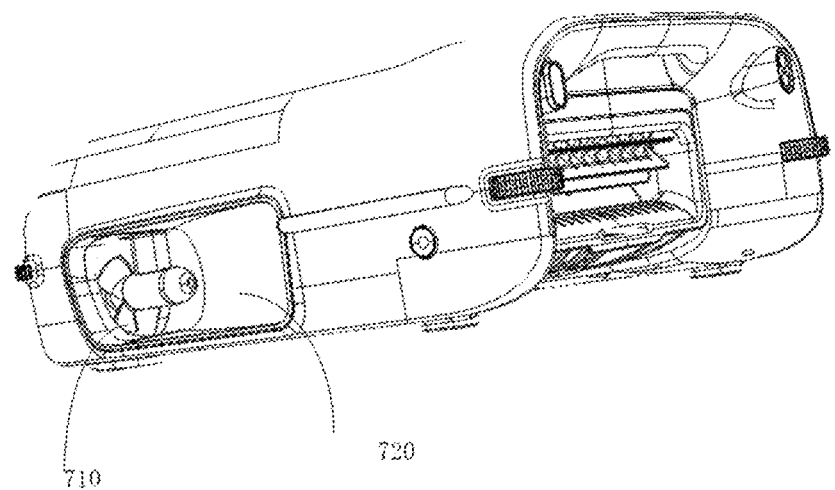
FIG. 7 illustrates a schematic appearance of a water surface cleaning apparatus according to an embodiment of the present disclosure.

According to an embodiment of the present disclosure, as illustrated in FIG. 7, the driving unit of the water surface cleaning apparatus is arranged in the waterflow channel, and the driving unit includes a propeller. As an example, the propeller can be driven to rotate by a motor, etc., so that waterflows through the waterflow channel drive the water surface cleaning apparatus to travel on the water surface.

According to an embodiment of the present disclosure, in response to the driving unit driving the water surface cleaning apparatus to move forward, the direction of the waterflow path provided by the waterflow channel is a direction from the water inlet of the waterflow channel to the water outlet of the waterflow channel; and in response to the driving unit driving the water surface cleaning apparatus to move backward, the direction of the waterflow path provided by the waterflow channel is a direction from the water outlet of the waterflow channel to the water inlet of the waterflow channel.

According to an embodiment of the present disclosure, a rotation direction of the propeller when the driving unit drives the water surface cleaning apparatus to move backward is opposite to the rotation direction of the propeller when the driving unit drives the water surface cleaning apparatus to move forward.

Figure 6A:
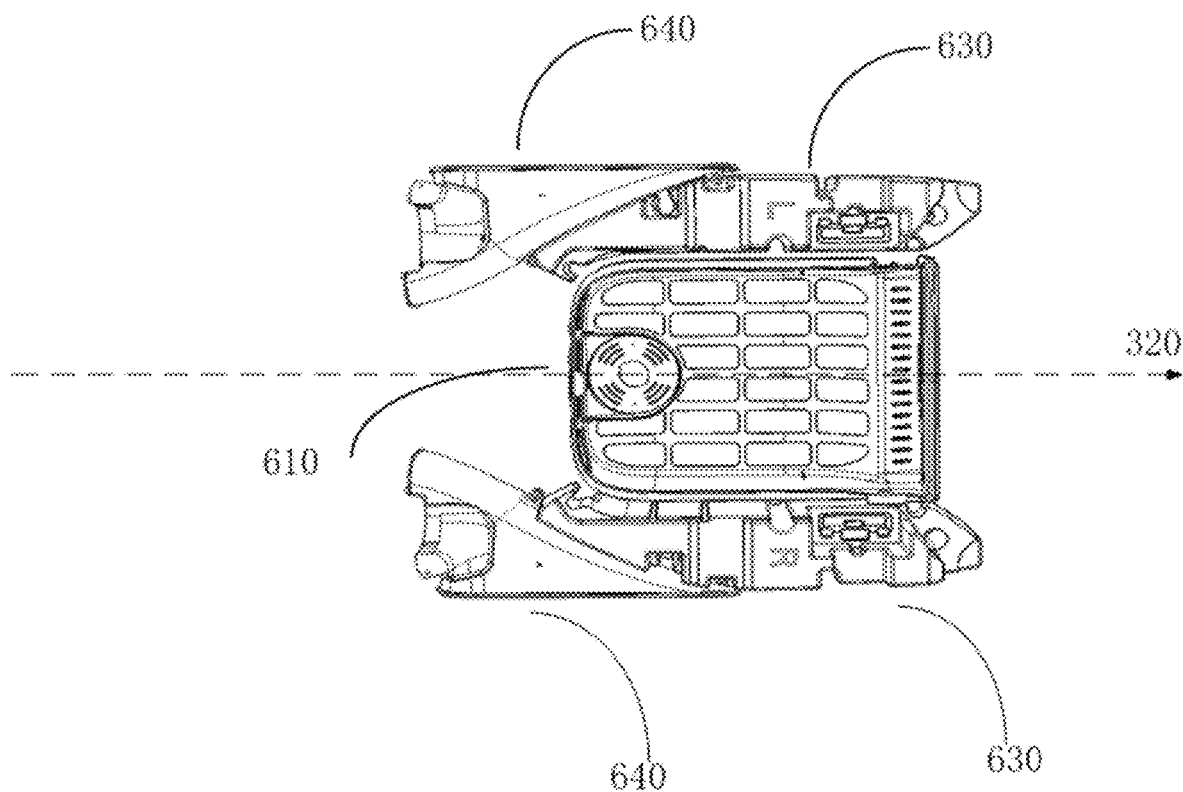
FIGS. 6A-6D schematically illustrate several components arranged in the housing of the water surface cleaning apparatus.
Figure 6B:
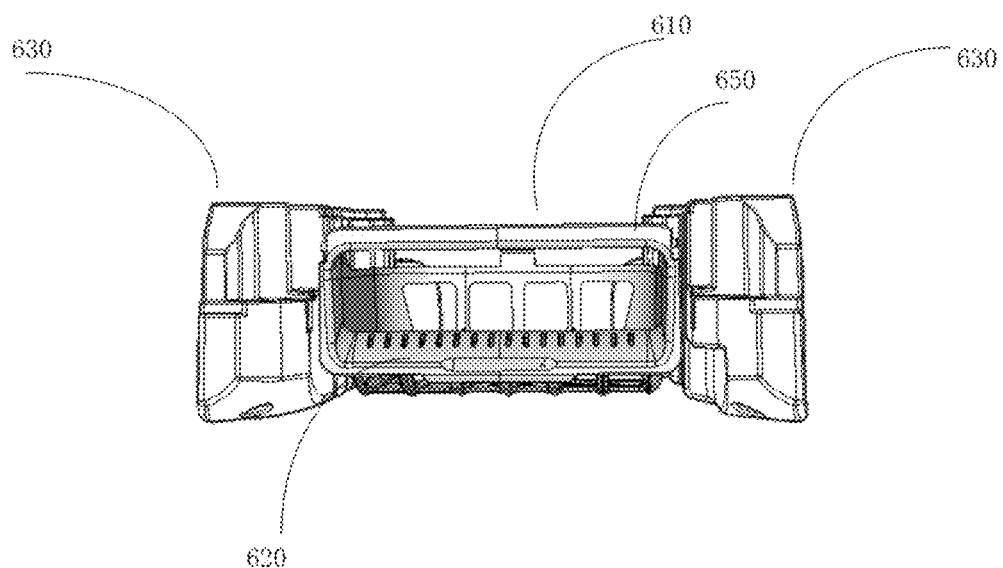

FIG. 6A schematically illustrates a top view of a layout of a buoyancy unit(s) 630, waterflow channels 640 symmetrically arranged on both sides of the longitudinal axis of the housing of the water surface cleaning apparatus and a filtering unit 610, according to an embodiment of the present disclosure, wherein the arrow of the longitudinal axis 320 indicates the direction from the rear end to the front end of the housing of the water surface cleaning apparatus. FIG. 6B schematically illustrates a front view of a layout of the filtering unit 610 and the buoyancy unit 630 inside the water surface cleaning apparatus according to an embodiment of the present disclosure.

According to an embodiment of the present disclosure, as illustrated in FIGS. 6A-6B, a buoyancy unit 630 is provided between the filtering unit 610 and the waterflow channel 640, and the buoyancy unit 630 provides buoyancy for suspending the water surface cleaning apparatus on the water surface. As an example, the water inlet 620 of the filtering unit 610 may have a flanging structure 650, which may block water from passing through a gap between the filtering unit 610 and the buoyancy unit 630. That is, during the travelling of the water surface cleaning apparatus, the garbage on the water surface in front of the travelling direction of the water surface cleaning apparatus will enter the water inlet 620 of the filtering unit 610 with the waterflow, and will not overflow into the gap between the filtering unit 610 and the buoyancy unit 630, since the flanging structure 650 at the water inlet 620 of the filtering unit 610 is adjacent to or abuts against the end face of the buoyancy unit 630, so that the garbage cannot enter the gap therebetween.

Therefore, even if the filtering unit of the water surface cleaning apparatus can communicate with the waterflow channel, the water entering the water inlet of the filtering unit will be filtered by the filtering unit and then discharged to the waterflow channel, thus preventing the garbage/debris carried in the water entering the water inlet of the filtering unit from entering the waterflow channel, blocking the waterflow channel and/or winding on the propeller of the driving unit located in the waterflow channel, resulting in lowering the traveling speed of the water surface cleaning apparatus and/or increasing the driving power consumption of the water surface cleaning apparatus.

According to the embodiment of the present disclosure, a waterflow guiding mechanism may be arranged at the water inlet of the filtering unit of the water surface cleaning apparatus, for guiding the water in front of the traveling direction of the water surface cleaning apparatus to enter the filtering unit through the water inlet.

Figure 6C:
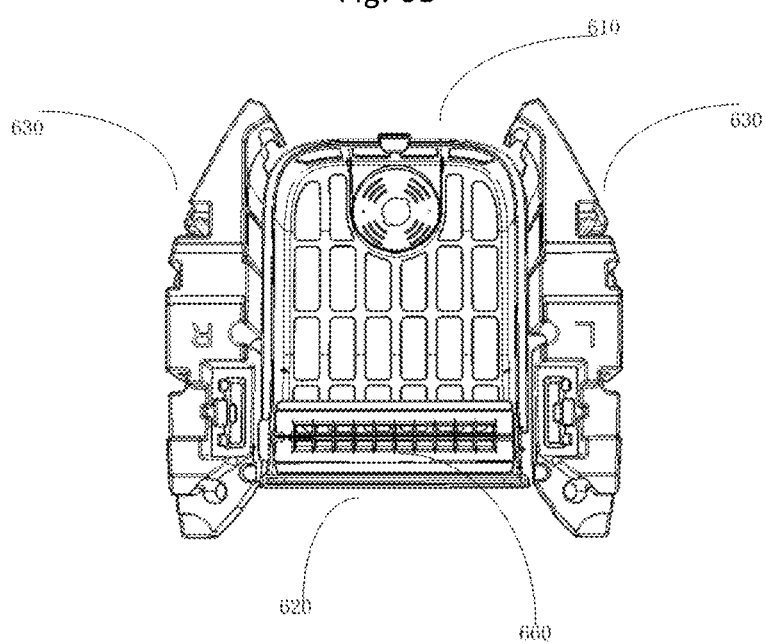

As illustrated in FIG. 6C, a waterflow guiding mechanism 660 may be provided at the water inlet 620 of the filtering unit 610 of the water surface cleaning apparatus, for guiding the water in front of the traveling direction of the water surface cleaning apparatus to enter the filtering unit 610 through the water inlet 620. Therefore, garbage/debris on the water surface in a large range in front of the traveling direction of the water surface cleaning apparatus can be sucked into the filtering unit of the water surface cleaning apparatus.

As an example, as a component that can guide the water in front of the traveling direction of the water surface cleaning apparatus to the water inlet of the filtering unit, the waterflow guiding mechanism may include a component such as a roller brush, a paddle, or an impeller, and the rotation of the waterflow guiding mechanism may be driven by a driving component such as a motor.

As an example, the above-mentioned waterflow guiding mechanism 660 can be driven by a driving unit that drives the water surface cleaning apparatus to travel, that is, the driving unit drives the waterflow guiding mechanism to rotate while generating a driving force to push the water surface cleaning apparatus to move, so as to guide the waterflow into the interior of the filtering unit. Alternatively, the waterflow guiding mechanism 660 may be equipped with a separate driving mechanism to independently control the motion of the waterflow guiding mechanism.

As an example, the waterflow guiding mechanism 660 is detachably arranged in the water surface cleaning apparatus, which is convenient for users to clean and maintain the water surface cleaning apparatus.

According to embodiments of the present disclosure, in the above-mentioned water surface cleaning apparatus, an openable flapper can be further arranged at the water inlet of the filtering unit for adjusting the open or closed status of the filtering unit.

Figure 6D:
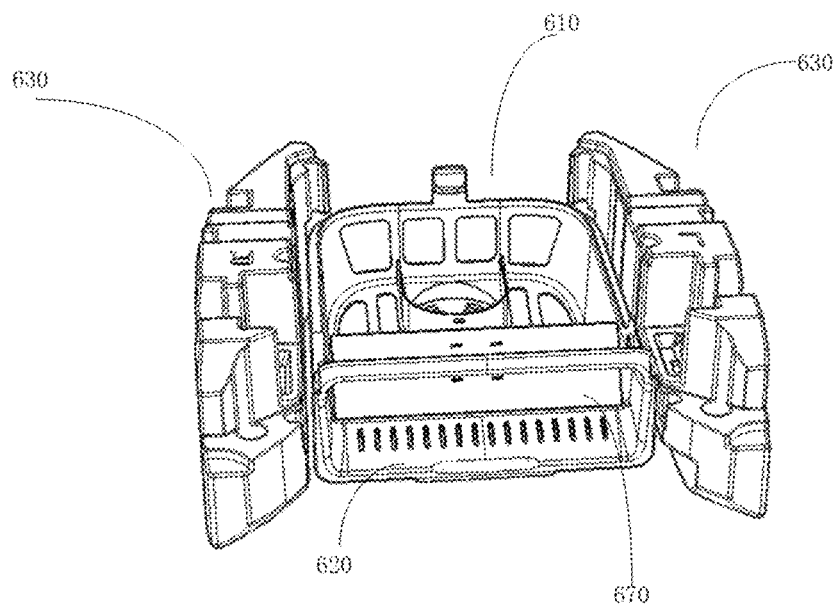

As illustrated in FIG. 6D, an openable flapper 670 may be provided at the water inlet 620 of the filtering unit 610 of the water surface cleaning apparatus for adjusting the open or closed status of the filtering unit.

As an example, the flapper can be a movable one-way valve, which is connected with the filtering unit through components such as via a hinge or buckle. When the water surface cleaning apparatus travels, the flapper is automatically opened or pushed away by the waterflow in front of the travel direction of the water surface cleaning apparatus, so that the water in front of the travel direction of the water surface cleaning apparatus can enter the filtering unit; by arranging the movable flapper at the water inlet of the filtering unit, the sewage in the filtering unit can be prevented from flowing back to the pool through the water inlet of the filtering unit, thus ensuring the cleaning effect on the water surface.

According to an embodiment of the present disclosure, in the above-mentioned water surface cleaning apparatus, the filtering unit may take the form of a filter basket and may have a corresponding handle to facilitate taking out and/or installing the filtering unit in the housing of the water surface cleaning apparatus.

According to the water surface cleaning apparatus of the embodiment of the present disclosure, waterflow channels are symmetrically arranged on both sides along the longitudinal axis between the front end and the rear end of the housing of the water surface cleaning apparatus, the direction of the waterflow path provided by the waterflow channels is in an inclined angle with respect to the longitudinal axis, and the water surface cleaning apparatus is driven to travel on the water surface by driving the waterflow through the waterflow channels; compared with utilizing the waterflow through the waterflow path provided by the filtering unit of the water surface cleaning apparatus to drive the water surface cleaning apparatus to travel, the resistance to the waterflow is significantly reduced, the travelling efficiency of the water surface cleaning apparatus is increased, the power consumption is reduced, and the working time of the water surface cleaning apparatus for cleaning operation can be prolonged.

In addition, according to the water surface cleaning apparatus of the embodiment of the present disclosure, since the water inlet of the filtering unit of the water surface cleaning apparatus is closer to the front end of the housing of the water surface cleaning apparatus than the water inlet of the waterflow channel, when the water surface cleaning apparatus travels on the water surface, the garbage/debris in front will first enter the filtering unit through the water inlet of the filtering unit, that is, the garbage/debris in front will be collected/trapped by the filtering unit, reducing or even eliminating the garbage/debris that may enter the waterflow channel of the water surface cleaning apparatus, so that the waterflow channel is kept free from obstruction, the resistance to waterflow through the waterflow channel is reduced, the traveling efficiency of the water surface cleaning apparatus is further improved, and the traveling power consumption of the water surface cleaning apparatus is reduced, thus prolonging the operation time of the water surface cleaning apparatus for cleaning operation.

In addition, according to the water surface cleaning apparatus of the embodiment of the present disclosure, the water inlet of the waterflow channel is arranged at the side of the housing of the water surface cleaning apparatus, and the water outlet thereof is arranged at the rear end of the housing of the water surface cleaning apparatus. Therefore, even if a little garbage/debris are gathered/deposited in the waterflow channel or wound on the propeller of the driving unit located in the waterflow channel, it is easy to remove the garbage/debris, thus reducing the cleaning cost.

Several aspects of the present disclosure have been presented above with reference to various devices and methods. These devices and methods are illustrated in the drawings by various blocks, components, circuits, procedures, algorithms, etc. (collectively referred to as "elements"). These elements can be implemented using electronic hardware, computer software or any combination thereof. Whether these components are implemented as hardware or software depends on the specific application and the design constraints of the whole system.

For example, an element or any part of an element or any combination of elements may be implemented as a "processing system" including one or more processors. One or more processors in a processing system may execute software. Software should be broadly interpreted as instructions, instruction sets, codes, code segments, program codes, programs, subroutines, software components, applications, software applications, software packages, routines, subroutines, objects, executable programs, execution threads, procedures, functions, etc., whether called software, firmware, middleware, microcode, hardware description language or others.

Thus, in one or more example embodiments, the described functions may be implemented in hardware, software, or any combination thereof. If implemented in software, these functions can be stored or encoded as one or more instructions or codes on a computer-readable medium. Computer-readable media include computer storage media. Storage media can be any available media that can be accessed by a computer. By way of example and not limitation, such computer-readable media may include random access memory (RAM), read-only memory (ROM), electrically erasable programmable ROM (EEPROM), optical disk storage, magnetic disk storage, other magnetic storage devices, combinations of the above types of computer-readable media, or any other media that can be used to store computer-executable code in the form of instructions or data structures accessible by a computer.

It should be understood that the particular order or hierarchy of blocks in the disclosed process/flowchart is illustrative of an example method. Based on design preferences, it should be understood that a specific order or hierarchy of blocks in a process/flowchart may be rearranged. In addition, some blocks may be combined or omitted. The appended method claims present the elements of various blocks in sample order and are not meant to be limited to the particular order or hierarchy presented.

The foregoing description is provided to enable those skilled in the art to practice various aspects described herein. Unless otherwise stated, references to elements in the singular are not intended to mean "one and only one" but "one or more". The expression "exemplary" used here means "serving as an example, instance or illustration". Any aspect described herein as "exemplary" is not necessarily to be construed as more preferred or advantageous than other aspects. Unless otherwise stated, the term "some" refers to one or more. Combinations such as "at least one of A, B or C", "one or more of A, B or C", "at least one of A, B and C", "one or more of A, B and C", and "A, B, C or any combination thereof" include any combination of A, B and/or C, and may include multiples of A, multiples of B or multiples of C. Specifically, combinations such as "at least one of A, B or C", "A, B or C", "at least one of A, B and C", "one or more of A, B and C" and "A, B, C or any combination thereof" may be only A, only B, only C, A and B, A and C, B and C, A and B and C, wherein, any such combination can include one or more members of A, B and C or all the members.

In this disclosure, unless otherwise specified, the terms "install", "arrange", "connect", "attach", "fix", and "coupling", etc. should be broadly construed, for example, they can be fixed, detachable or integrated; they can be mechanically connected, electrically connected or communicatively connected with each other; they can be directly connected or indirectly connected through an intermediary, or it refers to the internal connection of two elements or the interaction between two elements, unless otherwise specified. For those skilled in the art, the specific meanings of the above terms in this disclosure can be understood according to specific situations.

Apparently, the embodiment described above is only a part of the embodiment of this application, but not all the embodiments. Some embodiments of this application are illustrated in the drawings, but they do not limit the protection scope of this application. This application can be implemented in many different forms. Further, these embodiments are provided to make the disclosure of this application more thorough and comprehensive. Although the present application has been described in detail with reference to the aforementioned embodiments, it is still possible for those skilled in the art to modify the technical solutions described in the aforementioned specific embodiments or to replace some technical features with equivalents. Any equivalent structure made by using the description and drawings of this application, which is directly or indirectly used in other related technical fields, is within the scope of protection scope of this application.

What is claimed is:

1. A water surface cleaning apparatus comprising:
a housing comprising a front end close to a traveling direction of the water surface cleaning apparatus and a rear end far away from the traveling direction of the water surface cleaning apparatus;
a filtering unit detachably arranged in the housing, the filtering unit comprising a water inlet and at least one water outlet, the filtering unit configured to filter water entering the filtering unit via the water inlet and discharge the filtered water out of the filtering unit via the at least one water outlet;
a driving unit configured to drive the water surface cleaning apparatus to travel on a water surface;
wherein waterflow channels are symmetrically arranged on both sides along a longitudinal axis between the front end and the rear end of the housing, and the driving unit is configured to drive the water surface cleaning apparatus to travel on the water surface by driving waterflows through the waterflow channels;
wherein, a direction of a waterflow path provided by each of the waterflow channels is approximately inclined with respect to the longitudinal axis; and
wherein the waterflow channels partially surround the filter unit, and at least one part of each of the waterflow channels faces a side of the filter unit in a horizontal direction.

2. The water surface cleaning apparatus according to claim 1, wherein each of the waterflow channels comprises a water inlet and a water outlet, wherein the water inlet is arranged at a side surface of the housing, and the water outlet is arranged at the rear end of the housing.

3. The water surface cleaning apparatus according to claim 2, wherein the water inlet of the filtering unit is closer to the front end of the housing than the water inlet of each of the waterflow channels.

4. The water surface cleaning apparatus according to claim 3, wherein at least one opening is arranged on the housing, and the water discharged from the at least one water outlet of the filtering unit is discharged from the water surface cleaning apparatus via the at least one opening.

5. The water surface cleaning apparatus according to claim 2, wherein in response to the driving unit driving the water surface cleaning apparatus to move forward, the direction of the waterflow path provided by the waterflow channel is a direction from the water inlet of the waterflow channel to the water outlet of the waterflow channel; and in response to the driving unit driving the water surface cleaning apparatus to move backward, the direction of the waterflow path provided by the waterflow channel is a direction from the water outlet of the waterflow channel to the water inlet of the waterflow channel.

6. The water surface cleaning apparatus according to claim 5, wherein the driving unit is arranged in each of the waterflow channels and comprises a propeller.

7. The water surface cleaning apparatus according to claim 6, wherein a rotation direction of the propeller when the driving unit drives the water surface cleaning apparatus to move backward is opposite to the rotation direction of the propeller when the driving unit drives the water surface cleaning apparatus to move forward.

8. The water surface cleaning apparatus according to claim 2, wherein a buoyancy unit is arranged between the filtering unit and each of the waterflow channels, and the buoyancy unit is configured to provide buoyancy for suspending the water surface cleaning apparatus on the water surface.

9. The water surface cleaning apparatus according to claim 8, wherein the water inlet of the filtering unit is provided with a flanging structure, and the flanging structure is configured to prevent water from passing through a gap between the filtering unit and the buoyancy unit.

10. The water surface cleaning apparatus according to claim 2, wherein the water inlet of the filtering unit is provided with a waterflow guiding mechanism for guiding the water in front of the travel direction of the water surface cleaning apparatus to enter the filtering unit via the water inlet.

11. The water surface cleaning apparatus according to claim 2, wherein the water inlet of the filtering unit is further provided with an openable flapper for adjusting an open or closed status of the filtering unit.

12. The water surface cleaning apparatus according to claim 2, wherein the filtering unit is a filter basket.

13. The water surface cleaning apparatus according to claim 1, wherein at least one opening is arranged on the housing, and the water discharged from the at least one water outlet of the filtering unit is discharged from the water surface cleaning apparatus via the at least one opening.

14. The water surface cleaning apparatus according to claim 1, wherein the water discharged from the at least one water outlet of the filtering unit is discharged from the water surface cleaning apparatus via each of the waterflow channels.

15. The water surface cleaning apparatus according to claim 1, wherein the driving unit is arranged in each of the waterflow channels and comprises a propeller.

16. The water surface cleaning apparatus according to claim 1, wherein a buoyancy unit is arranged between the filtering unit and each of the waterflow channels, and the buoyancy unit is configured to provide buoyancy for suspending the water surface cleaning apparatus on the water surface.

17. The water surface cleaning apparatus according to claim 16, wherein the water inlet of the filtering unit is provided with a flanging structure, and the flanging structure is configured to prevent water from passing through a gap between the filtering unit and the buoyancy unit.

18. The water surface cleaning apparatus according to claim 1, wherein the water inlet of the filtering unit is provided with a waterflow guiding mechanism for guiding the water in front of the travel direction of the water surface cleaning apparatus to enter the filtering unit via the water inlet.

19. The water surface cleaning apparatus according to claim 1, wherein the water inlet of the filtering unit is further provided with an openable flapper for adjusting an open or closed status of the filtering unit.

20. The water surface cleaning apparatus according to claim 1, wherein the filtering unit is a filter basket.

* * * * *